(12) United States Patent
Han (10) Patent No.: US 9,441,511 B2
(45) Date of Patent: Sep. 13, 2016

(54) APPARATUS FOR ADJUSTING TEMPERATURE OF OIL FOR VEHICLE AND METHOD FOR CONTROLLING THE APPARATUS

(71) Applicant: Hyundai Motor Company, Seoul (KR)

(72) Inventor: Jung Jae Han, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 261 days.

(21) Appl. No.: 14/322,494

(22) Filed: Jul. 2, 2014

(65) Prior Publication Data
US 2015/0176445 A1  Jun. 25, 2015

(30) Foreign Application Priority Data

Dec. 20, 2013  (KR) .................. 10-2013-0160190

(51) Int. Cl.
| | | |
|---|---|---|
| *F01M 5/00* | (2006.01) | |
| *F02D 41/00* | (2006.01) | |
| *F02D 41/14* | (2006.01) | |
| *F02D 41/06* | (2006.01) | |

(52) U.S. Cl.
CPC .............. *F01M 5/005* (2013.01); *F01M 5/001* (2013.01); *F02D 41/005* (2013.01); *F02D 41/0052* (2013.01); *F02D 41/068* (2013.01); *F02D 41/1439* (2013.01); *F02D 41/1461* (2013.01); *F02D 41/1463* (2013.01); *F02D 2200/021* (2013.01); *F02D 2200/023* (2013.01); *Y02T 10/47* (2013.01)

(58) Field of Classification Search
CPC ........ F01M 5/00; F01M 5/001; F01M 5/005; F02D 41/00; F02D 41/14; F02D 41/005; F02D 41/0052; F02D 41/1439; F02D 41/1461; Y02T 10/47
See application file for complete search history.

(56) References Cited

U.S. PATENT DOCUMENTS 7,237,513 B2 * 7/2007 Pfeffinger ............... F01P 7/162
123/41.29

FOREIGN PATENT DOCUMENTS

| | | |
|---|---|---|
| EP | 1857761 A2 | 11/2007 |
| JP | 11-125151 A | 5/1999 |
| JP | H11-311114 A | 11/1999 |
| JP | 2001-323844 A | 11/2001 |
| JP | 2009-180100 A | 8/2009 |
| JP | 2011-179421 A | 9/2011 |
| KR | 1020040033790 A | 4/2004 |

* cited by examiner

*Primary Examiner* — Hieu T Vo
(74) *Attorney, Agent, or Firm* — Morgan, Lewis & Bockius LLP (57) ABSTRACT

Disclosed are an apparatus for adjusting temperature of oil for a vehicle, and a method for controlling the apparatus. The apparatus includes an EGR valve installed on a fluid channel branching off from an exhaust pipe, a complex heat exchanger structured to transfer exhaust gas having passed through the EGR valve to an engine intake pipe via an EGR cooling path in which the exhaust gas having passed through the EGR valve performs heat exchange with coolant, an oil heating path in which the exhaust gas having passed through the EGR valve performs heat exchange with oil, and a bypass path in which the exhaust gas having passed through the EGR valve does not perform heat exchange, an NOx sensor installed in the exhaust pipe, and a controller that controls the complex heat exchanger in response to a signal from the NOx sensor.

9 Claims, 6 Drawing Sheets

APPARATUS FOR ADJUSTING TEMPERATURE OF OIL FOR VEHICLE AND METHOD FOR CONTROLLING THE APPARATUS

CROSS REFERENCE TO RELATED APPLICATION

The present application claims priority of Korean Patent Application Number 10-2013-0160190 filed on Dec. 20, 2013, the entire contents of which application are incorporated herein for all purposes by this reference.

BACKGROUND OF INVENTION

1. Field of Invention

The present invention relates to an apparatus for adjusting temperature of oil for a vehicle and a method for controlling the apparatus, and more particularly to a technology which controls temperature of oil by using heat of exhaust gas from an engine.

2. Description of Related Art

When starting a vehicle, oil for an engine or transmission at low temperatures undergoes a warm-up process so that the oil can be maintained at an appropriate temperature for driving of the vehicle. After the oil is warmed up, the engine or transmission can operate normally.

A conventional oil warming-up method usually includes a first warm-up through which coolant is primarily warmed up by passing through a water jacket disposed in a combustion chamber of an engine and a second warm-up through which oil is then warmed up by performing heat exchange with the coolant. This method has a drawback in that warm-up is too slow. Accordingly, rapid warm-up which uses exhaust gas of a high temperature for warm-up has been recently, broadly used.

In case of a heat exchanger using heat of exhaust gas, exhaust gas and oil have to be appropriately controlled at each stage, i.e., before warm-up, during warm-up, and after warm-up. Since exhaust gas with a relatively high temperature and oil of a relatively low temperature exchange heat with each other, inappropriate heat exchange causes durability problems such as fouling and carbonization and affects ingredients of the exhaust gas, such as HC (hydrocarbon), CO, and NOx.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art and/or other problems, and the present invention is intended to provide an apparatus for adjusting the temperature of oil for a vehicle, and a method for controlling the apparatus, having at least the following advantages: (a) being able to rapidly and appropriately warm up oil using heat of exhaust gas, reducing friction of an engine and transmission and reducing the driving power of an oil pump, resulting in improvements in fuel efficiency and durability; (b) being able to reduce time that takes to reach optimum lubricating conditions, reducing noise and vibrations, and (c) being able to improve EGR cooling efficiency.

According to various aspects, there is provided an apparatus for adjusting temperature of oil for a vehicle, the apparatus including an Exhaust Gas Recirculation (EGR) valve installed on a fluid channel branching off from an exhaust pipe, a complex heat exchanger structured to transfer exhaust gas having passed through the EGR valve to an engine intake pipe via an EGR cooling path in which the exhaust gas having passed through the EGR valve performs heat exchange with a coolant, an oil heating path in which the exhaust gas having passed through the EGR valve performs heat exchange with the oil, and a bypass path in which the exhaust gas having passed through the EGR valve does not perform heat exchange, an NOx sensor installed in the exhaust pipe, and a controller that controls the complex heat exchanger in response to a signal from the NOx sensor, in which the complex heat exchanger is provided with an exhaust gas passage for the exhaust gas bound for the EGR cooling path under control by the controller, a swing valve that selectively fully closes any one of exhaust gas passages for the exhaust gas bound for the oil heating path and the bypass path, and a bypass valve that opens or closes the bypass path.

According to various other aspects, there is provided a method for controlling the oil temperature controlling apparatus, the method including a first temperature determination step of determining whether temperature of the coolant is below a first reference temperature which represents a critical point at which HC (hydrocarbon) and carbon in the exhaust gas condenses and collects in the complex heat exchanger, and a first mode implementation step of performing control so that the bypass valve is fully opened, and the swing valve fully closes the EGR cooling path, if the first temperature determination step determines that the temperature of the coolant is below the first reference temperature.

The apparatus and method according to the present invention has at least the following advantages. First, it is possible to rapidly and appropriately warm up oil using heat of exhaust gas, reducing friction of an engine and transmission and reducing the driving power of an oil pump, resulting in improvements in fuel efficiency and durability. Second, it is possible to reduce time that it takes to reach optimum lubricating conditions, reducing noise and vibrations. Finally, it is possible to improve EGR cooling efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

With reference to FIGS. 1 to 4, an apparatus for adjusting temperature of oil for a vehicle according to various embodiments of the present invention includes an EGR valve 1 installed on a fluid channel 102 branching off from an exhaust pipe 104; a complex heat exchanger 9 structured to transfer exhaust gas having passed through the EGR valve 1 to an intake pipe 106 of an engine via an EGR cooling path 3 in which the exhaust gas having passed through the EGR valve 1 performs heat exchange with coolant; an oil heating path 5 in which the exhaust gas having passed through the EGR valve performs heat exchange with oil; and a bypass path 7 in which the exhaust gas having passed through the EGR valve 1 does not perform heat exchange; an NOx sensor 11 installed in the exhaust pipe; and a controller 13 that controls the complex heat exchanger 9 in response to a signal from the NOx sensor 11.

The complex heat exchanger 9 may be provided with an exhaust gas passage (e.g., 108 in FIG. 3) for exhaust gas bound for the EGR cooling path 3 under control by the controller 13, a swing valve 15 that selectively, fully closes any one of exhaust gas passages (e.g., 110, 112 in FIG. 3) for exhaust gas bound for the oil heating path 5 and the bypass path 7, and a bypass valve 17 that opens and closes the bypass path 7.

Oil circulates around the oil heating path 5 of the complex heat exchanger 9 in order to perform heat exchange with the exhaust gas, and an oil control valve 19 is further included to open and close the path of the circulating oil.

In various embodiments of the present invention, the complex heat exchanger 9 functions as a bypass pipe as well as an EGR cooler which cools exhaust gas and supplies the resultant exhaust gas to the engine intake pipe and an oil heater. In addition, the controller 13 receives the signal from the NOx sensor 11 and other information and appropriately controls the swing valve 15 and the bypass valve 17. In this way, the present invention uses the heat of the exhaust gas to rapidly and appropriately warm up the oil, improving EGR cooling efficiency.

When the oil is rapidly and appropriately warmed up as described above, friction of an engine or transmission is reduced and the driving power for an oil pump is also reduced. This leads to improvements in fuel efficiency and durability of the parts. Furthermore, since the time which it takes to reach optimum lubricating conditions is shortened, noise and vibrations are also reduced.

In various embodiments, the complex heat exchanger 9 includes an inlet flange 21, an exchanger body 23, and an outlet flange 25. The inlet flange 21 is connected to the EGR valve 1 and is equipped with the swing valve 15. The exchanger body 23 is connected to the inlet flange 21 and is structured such that the EGR cooling path 3 and the oil heating path 5 are arranged to be in parallel or substantially in parallel with the bypass path 7 disposed between them. The exchanger body 23 is also structured to switch between a state in which the exhaust gas can pass through the EGR cooling path 3 and a state in which the exhaust gas can pass through the oil heating path 5 and the bypass path 7, according to swinging of the swing valve 15. The outlet flange 25 is connected to the exchanger body 23 and the engine intake pipe.

The bypass valve 17 which opens and closes the bypass path 7 is installed on the side of the outlet flange 25 of the exchanger body 23.

Figure 1:
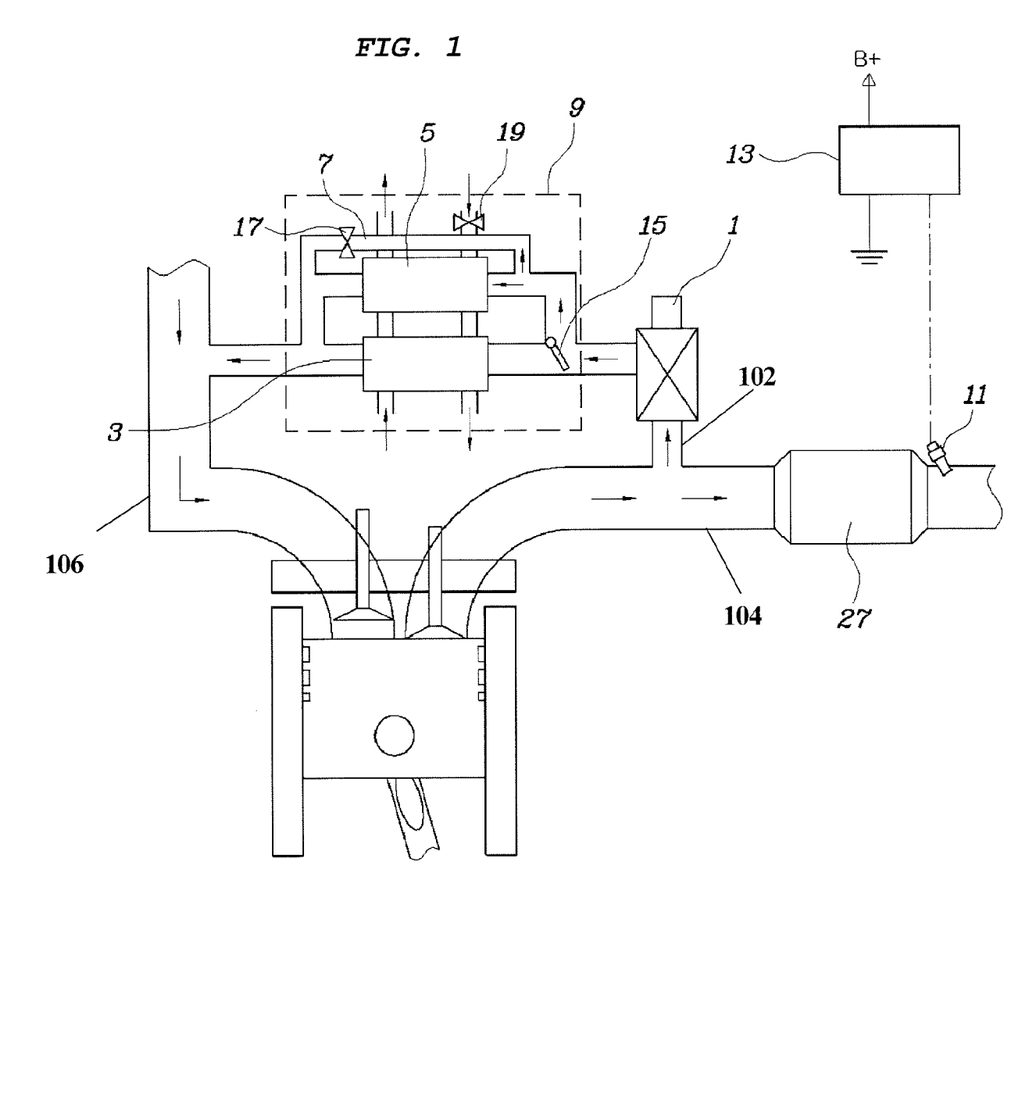
FIG. 1 is a view illustrating an exemplary apparatus for adjusting temperature of oil according to the present invention.
Figure 2:
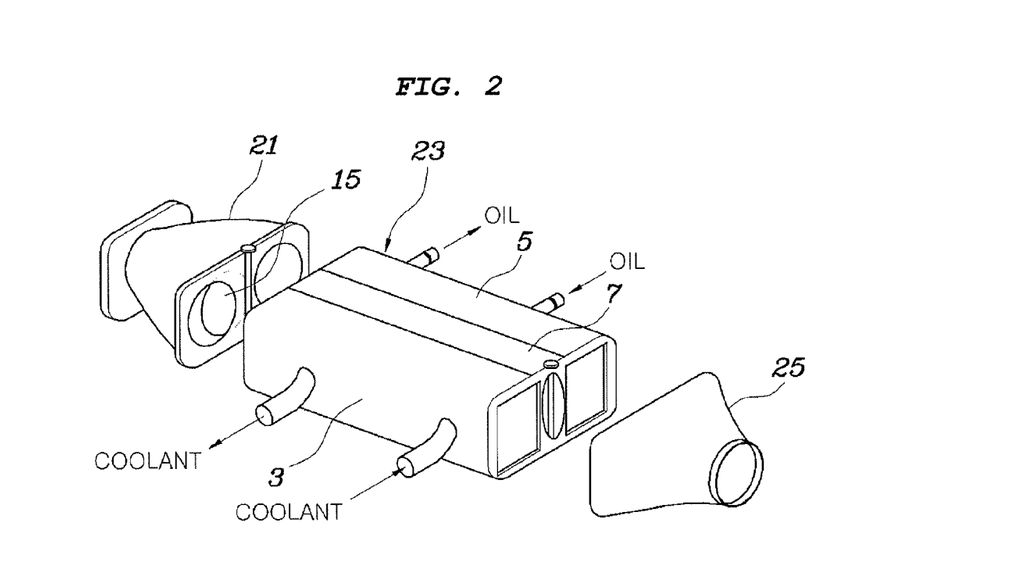
FIG. 2 is a view illustrating an exemplary complex heat exchanger shown in FIG. 1.
Figure 3:
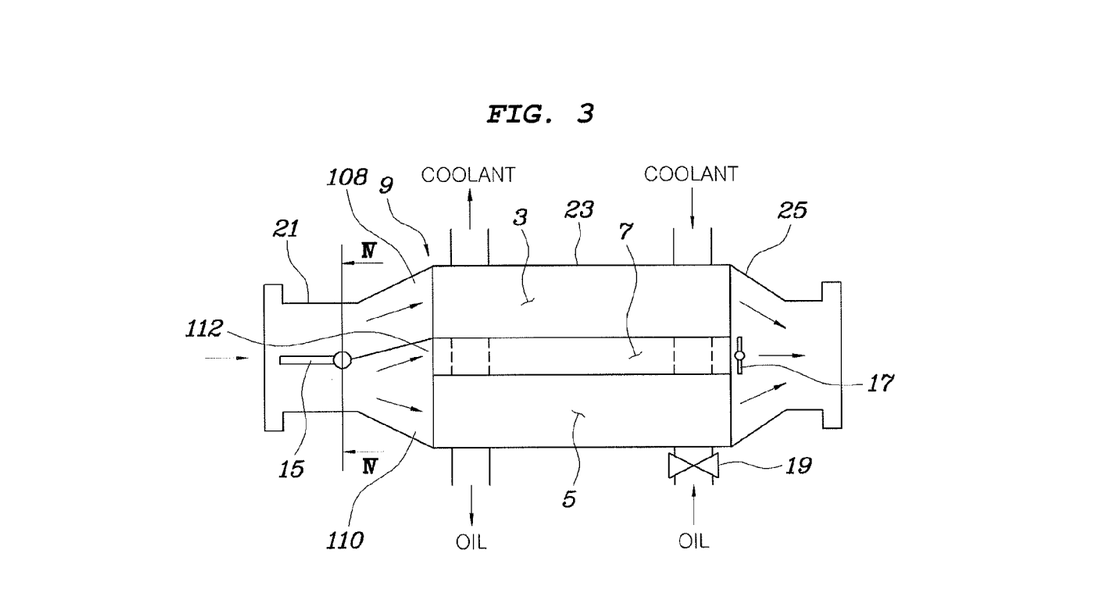
FIG. 3 is a schematic cross-sectional view describing the structure of the complex heat exchanger shown in FIG. 2.
Figure 4:
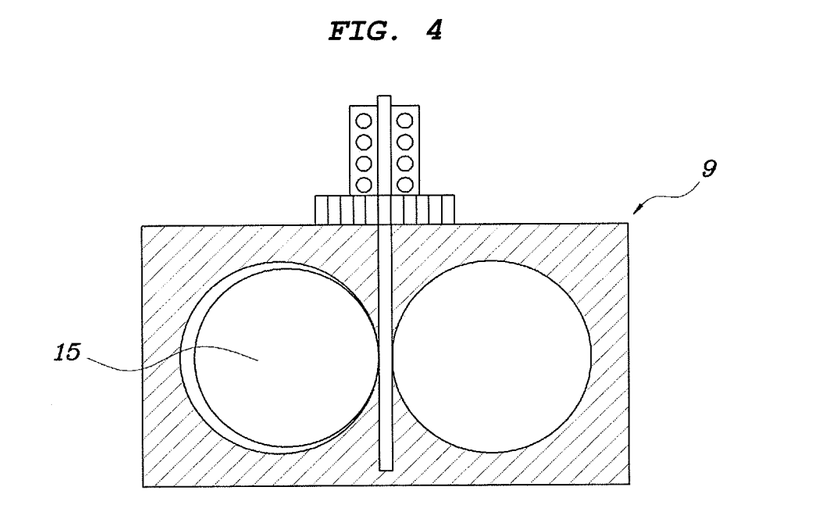
FIG. 4 is a cross-sectional view taken along line IV-IV of FIG. 3.
Figure 5:
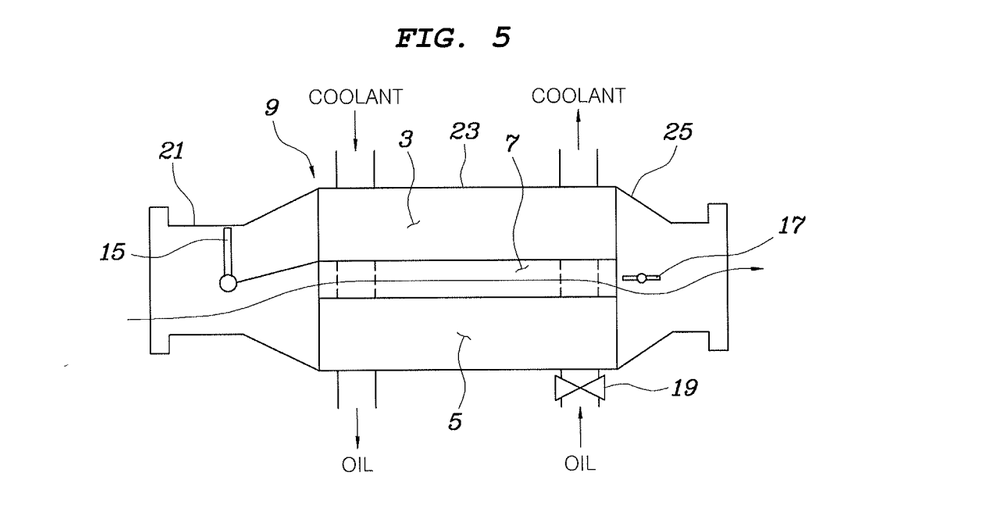
FIG. 5 is a view illustrating a state in which EGR gas does not pass through an EGR cooling path but entirely bypasses the path.

That is, the swing valve 15 closes or hermetically closes the passage of the exhaust gas bound for the EGR cooling path 3 as illustrated in FIG. 5, or closes or hermetically closes both of the oil heating path 5 and the bypass path 7 at the same time. The opening and closing of the bypass path 17 is possible only in the state in which the swing valve 15 is opening the oil heating path 5 and the bypass path 7 as illustrated in FIG. 5.

Coolant circulates around the EGR cooling path 3 of the complex heat exchanger 9, and oil and the coolant separately circulate around the oil heating path 5, through different fluid channels, respectively.

Accordingly, in positions around the EGR cooling path 3, the coolant heat-exchanges with the exhaust gas so that EGR gas to be supplied to an engine can be cooled down. In addition, in positions around the oil heating path 5, the exhaust gas heat-exchanges with the oil so that the oil can be warmed up. When the oil is warmed enough, the oil is cooled down again by the coolant so that the oil can always be maintained at an optimum temperature.

Figure 9:
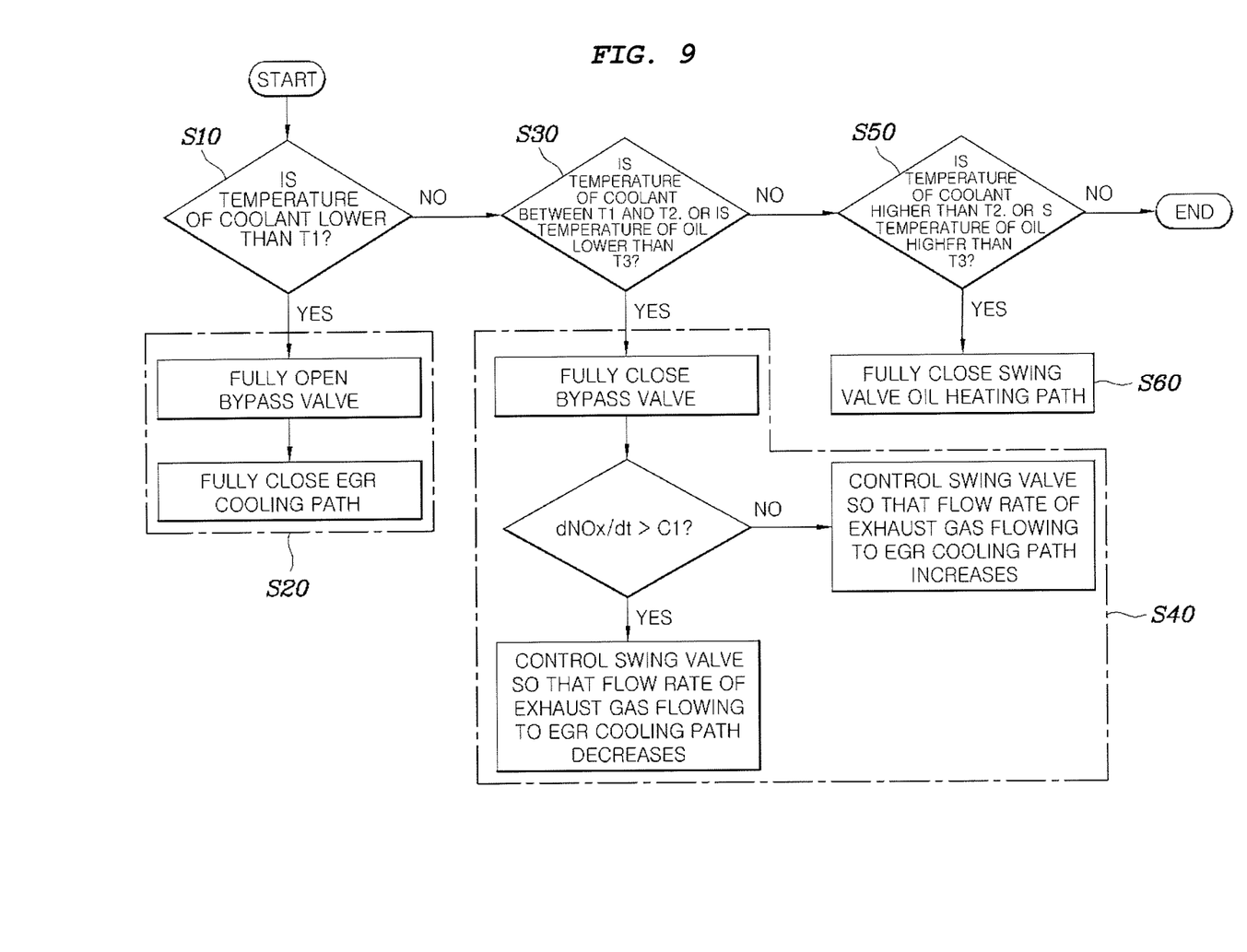
FIG. 9 is a flowchart showing an exemplary method for controlling an oil temperature adjusting apparatus for a vehicle according to the present invention.

Hereinbelow, a method for controlling the above-described oil-temperature controlling apparatus includes a first temperature determination step S10 and a first mode implementation step S20. The first temperature determination step S10 determines whether the temperature of the coolant is below a first reference temperature T1, e.g., a critical point at which HC and carbon in the EGR gas condenses to be collected in the complex heat exchanger 9. When an implementation result of the first temperature determination step S10 shows that the temperature of the coolant is below the first reference temperature T1, the first mode implementation step S20 performs control such that the bypass valve 17 is fully opened and the swing valve 15 fully closes the EGR cooling path.

That is, when the temperature of the coolant is below the first reference temperature T1 in the first temperature determination step S10, as shown in FIG. 5, the swing valve 15 is controlled to fully close the EGR cooling path 5 in a state where the bypass valve 17 is fully opened. By this control, the exhaust gas which comes out an exhaust pipe and passes through the EGR valve 1 is directed only to the oil heating path 5 and the bypass path 7. This enables oil to be rapidly warmed by exhaust gas immediately after cold starting, resulting in rapid warm-up. Moreover, it is possible to prevent the EGR gas of an excessively low temperature from being directly supplied to an engine but be supplied to the engine via the bypass path 7. Furthermore, it is possible to prevent HC and carbon from condensing, preventing the HC and carbon from being collected in the EGR cooling path 3 of the complex heat exchanger 9.

In various embodiments, when the implementation of the first temperature determination step S10 results that the temperature of the coolant is equal to or higher than the first reference temperature T1, a second temperature determination step S30 and/or a second mode implementation step S40 are performed. The second temperature determination step S30 determines whether the temperature of the coolant is equal to or higher than the first reference temperature T1 and is below a second reference temperature T2 which is a lower limit temperature to determine completion of warm-up, or determines whether the temperature of oil is below a third reference temperature T3 to determine if the oil has reached an optimum lubricating condition in which changes in viscosity of the oil converge to a predetermined value.

When the implementation results of the second temperature determination step S30 shows that the temperature of the coolant is equal to or higher than the first reference temperature T1 and below the second reference temperature T2 or that the temperature of the oil is below the third reference temperature T3, the second mode implementation step S40 is performed so that the opening of the swing valve 15 is controlled in different directions according to a current NOx increase rate in a state where the bypass path 17 is fully closed.

In the second mode implementation step S40, when the current NOx increase rate measured by the NOx sensor 11 exceeds an NOx reference value C1 which is a minimum value to determines that the EGR gas needs to be cooled down because the emission of NOx can exceed the emission standard of NOx in such a case, the swing valve 15 is controlled such that a flow rate of the exhaust gas flowing to the EGR cooling path 3 increases. Conversely, when the current NOx increase rate is equal to or less than the NOx reference value C1, the swing valve 15 is controlled such that the flow rate of the exhaust gas flowing to the oil heating path 5 and the bypass path 7 increases.

Figure 6:
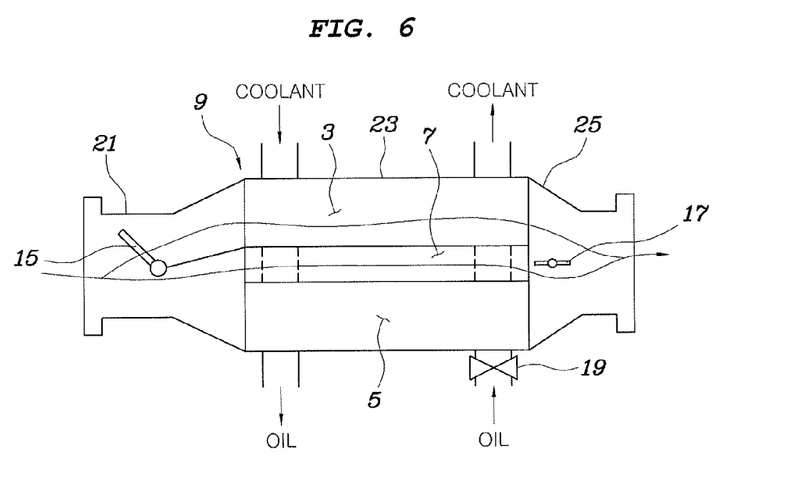
FIG. 6 is a view illustrating a state in which heating of oil and cooling of EGR gas are partly, simultaneously performed.
Figure 7:
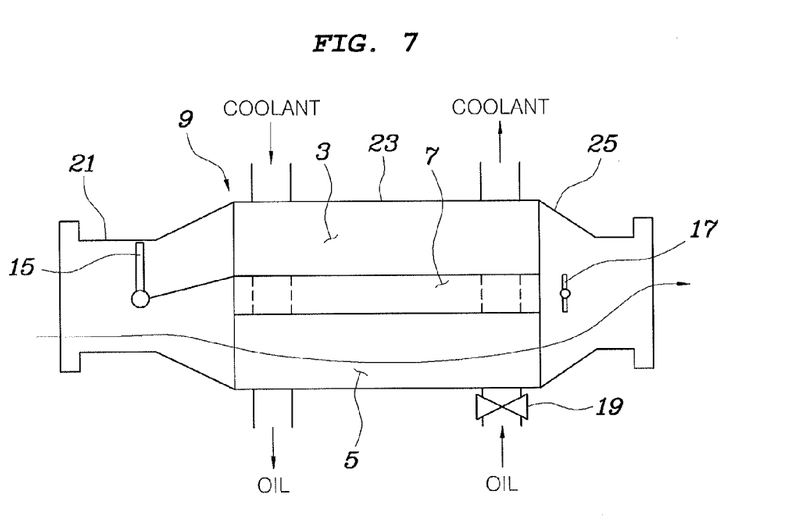
FIG. 7 is a view illustrating a state in which only oil heating is performed.

When the temperature of the coolant is between the first reference temperature T1 and the second reference temperature T2, or when the temperature of the oil is below the third reference temperature T3, as illustrated in FIG. 6, if the increase rate of NOx in the exhaust gas which passed a catalyst converter 27 in the exhaust pipe exceeds the NOx reference value C1 in a state where the bypass valve 17 is fully closed and there is the possibility that the NOx may exceed the NOx emission standard, cooling of the EGR gas needs to be further performed. Accordingly, in this case, the swing valve 15 is controlled such that the flow rate of the exhaust gas flowing to the EGR cooling path 3 increases. However, in the opposite case, the swing valve 15 is controlled such that the flow rate of the exhaust gas flowing to the EGR cooling path 3 decreases. For this, a feed-back control is performed so as to meet the NOx emission standard.

According to the present embodiment, a third temperature determination step S50 is performed when the implementation result of the second temperature determination step S30 reveals that the temperature of the coolant is equal to or higher than the second reference temperature T2 or that the temperature of the oil is equal to or higher than the third reference temperature T3. The third temperature determination step S50 confirms such temperature conditions. When the implementation result of the third temperature determination step S50 reveals that the temperature of the coolant is equal to or higher than the second reference temperature T2 or the temperature of the oil is equal to or higher than the third reference temperature T3, the third mode implementation step S60 is performed such that the swing valve 15 is controlled to fully close the oil heating path 5 and the bypass path 7.

Figure 8:
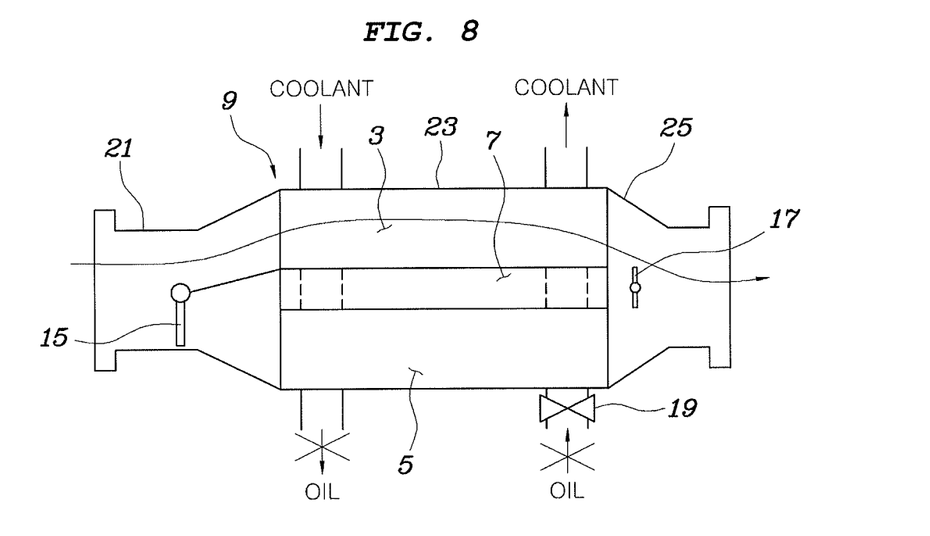
FIG. 8 is a view illustrating a state in which only EGR gas cooling is performed.

When the temperature of the coolant is equal to or higher than the second reference temperature T2 or the temperature of the oil is equal to or higher than the second reference temperature T3, an engine is to be operated under a condition of quite high temperatures. Accordingly, the swing valve 15 fully closes the oil heating path 5 so that the entire EGR gas supplied to an engine can be sufficiently cooled down while passing through the EGR cooling path 3 and then can be supplied to the engine as illustrated in FIG. 8. As a result, the NOx emission is suppressed to a minimum level.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for adjusting temperature of oil for a vehicle, the apparatus comprising:
    an Exhaust Gas Recirculation (EGR) valve installed on a fluid channel branching off from an exhaust pipe;
    a complex heat exchanger structured to transfer exhaust gas having passed through the EGR valve to an engine intake pipe via an EGR cooling path in which the exhaust gas having passed through the EGR valve performs heat exchange with a coolant, an oil heating path in which the exhaust gas having passed through the EGR valve performs heat exchange with the oil, and a bypass path in which the exhaust gas having passed through the EGR valve does not perform heat exchange;
    an NOx sensor installed in the exhaust pipe; and
    a controller that controls the complex heat exchanger in response to a signal from the NOx sensor,
    wherein the complex heat exchanger is provided with an exhaust gas passage for the exhaust gas bound for the EGR cooling path under control by the controller, a swing valve that selectively fully closes any one of exhaust gas passages for the exhaust gas bound for the oil heating path and the bypass path, and a bypass valve that opens or closes the bypass path.

2. The apparatus according to claim 1, where the oil circulates around the oil heating path of the complex heat exchanger in order to perform heat exchange with the exhaust gas and an oil control valve is installed to open or close a fluid channel of the circulating oil.

3. The apparatus according to claim 1, wherein the complex heat exchanger includes:

an inlet flange connected to the EGR valve and equipped with the swing valve;

an exchanger body connected to the inlet flange, structured such that the EGR cooling path and the oil heating path are arranged to be substantially in parallel with the bypass path disposed between the EGR cooling path and the oil heating path, and switched between a state where the exhaust gas passes through the EGR cooling path 3 and a state where the exhaust gas passes through the oil heating path and the bypass path according to turning of the swing valve; and an outlet flange connected to the exchanger body and the engine intake pipe.

4. The apparatus according to claim 3, wherein the bypass valve which opens or closes the bypass path is installed on one side of the outlet flange of the exchanger body.

5. The apparatus according to claim 1, wherein the coolant circulates around the EGR cooling path of the complex heat exchanger and the oil circulates around the oil heating path along different fluid channels, respectively.

6. A method for controlling the apparatus according to claim 1, the method comprising:

a first temperature determination step of determining whether temperature of the coolant is below a first reference temperature which represents a critical point at which HC (hydrocarbon) and carbon in the exhaust gas condenses and collects in the complex heat exchanger; and a first mode implementation step of performing control so that the bypass valve is fully opened, and the swing valve fully closes the EGR cooling path, if the first temperature determination step determines that the temperature of the coolant is below the first reference temperature.

7. The method according to claim 6, further comprising:

a second temperature determination step of determining whether the temperature of the coolant is below a second reference temperature at or above which an engine is determined to be sufficiently warmed up or whether the temperature of the oil is below a third reference temperature which represents an optimum lubricating state in which changes in viscosity of the oil converge to a predetermined value, wherein the second temperature determination step is performed if the first temperature determination step determines that the temperature of the coolant is equal to or higher than the first reference temperature; and a second mode implementation step of turning the swing valve in different directions according to a current NOx increase rate in a state where the bypass valve is fully closed, if the second temperature determination step determines that the temperature of the coolant is equal to or higher than the first reference temperature and is below the second reference temperature or that the temperature of the oil is below the third reference temperature.

8. The method according to claim 7, wherein in the second mode implementation step, the swing valve is controlled in a direction in which a flow rate of the exhaust gas flowing to the EGR cooling path increases, if the current NOx increase rate is determined to exceed an NOx emission standard and also exceeds an NOx reference value which is a minimum value of the NOx increase rate at which the EGR gas needs to be cooled down, based on the signal measured by the NOx sensor, and the swing valve is controlled in a direction in which a flow rate of the exhaust gas flowing to the oil heating path and the bypass path increases, if the current NOx increase rate is equal to or lower than the NOx reference value.

9. The method according to claim 8, further comprising:

a third temperature determination step of confirming determination results of the second temperature determination step, if the second temperature determination step determines that the temperature of the coolant is equal to or higher than the second reference temperature or that the temperature of the oil is equal to or higher than the third reference temperature; and a third mode implementation step of performing control so that the swing valve completely closes the oil heating path and the bypass path, when the temperature of the coolant is equal to or higher than the second reference temperature or when the temperature of the oil is equal to or higher than the third reference temperature.

* * * * *